(12) United States Patent
Salam et al.

(10) Patent No.: US 8,458,322 B2
(45) Date of Patent: Jun. 4, 2013

(54) DYNAMIC MANAGEMENT OF MAINTENANCE ASSOCIATION MEMBERSHIP IN A COMPUTER NETWORK

(75) Inventors: Samer Salam, Vancouver (CA); Norman W. Finn, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 928 days.

(21) Appl. No.: 12/508,634

(22) Filed: Jul. 24, 2009

(65) Prior Publication Data

US 2011/0022698 A1    Jan. 27, 2011

(51) Int. Cl.
*G06F 15/173*    (2006.01)

(52) U.S. Cl.
USPC ......................................... 709/224; 709/223

(58) Field of Classification Search
None
See application file for complete search history.

(56) References Cited

U.S. PATENT DOCUMENTS

| | | | |
|---|---|---|---|
| 6,967,972 B1 | 11/2005 | Volftsun et al. | |
| 7,515,542 B2 | 4/2009 | Hertoghs et al. | |
| 7,561,549 B2 | 7/2009 | Meier et al. | |
| 7,855,968 B2 * | 12/2010 | Elie-Dit-Cosaque et al. | 370/241.1 |
| 7,995,483 B1 * | 8/2011 | Bayar et al. | 370/241.1 |
| 8,027,258 B2 * | 9/2011 | Mizutani et al. | 370/236 |
| 8,169,896 B2 * | 5/2012 | Saltsidis et al. | 370/228 |
| 2006/0256731 A1 | 11/2006 | Jennings et al. | |
| 2007/0014290 A1 | 1/2007 | Dec et al. | |
| 2007/0025256 A1 | 2/2007 | Hertoghs et al. | |
| 2007/0201459 A1 | 8/2007 | Bao et al. | |
| 2007/0201480 A1 | 8/2007 | Bao et al. | |
| 2008/0175167 A1 | 7/2008 | Satyanarayanan et al. | |
| 2010/0262717 A1 * | 10/2010 | Critchley et al. | 709/251 |

FOREIGN PATENT DOCUMENTS

| | | | |
|---|---|---|---|
| CN | 101056223 A | * | 10/2007 |
| EP | 2110987 A1 | * | 10/2009 |

* cited by examiner

*Primary Examiner* — Jeffrey R Swearingen
(74) *Attorney, Agent, or Firm* — Cesari and McKenna, LLP

(57) ABSTRACT

In one embodiment, a new maintenance end-point (MEP) may join a particular network (and initiate its sending of continuity check messages, "CCMs") by transmitting one or more join announcement messages (JAMs). When the JAMs are received by remote MEPs in the particular network, the new MEP may be added to a configured list of MEPs within the particular network at each remote MEP without an alarm. Also, a current MEP may leave the particular network (and cease its transmission of CCMs) by transmitting one or more leave announcement messages (LAMs), which request removal of the current MEP from the configured list at each of the remote MEPs without alarms. Otherwise, transmission of CCMs (that are not JAMs or LAMs) may result in alarms being generated by the MEPs in the particular network for unexpected MEPs or missing MEPs, accordingly.

24 Claims, 8 Drawing Sheets

DYNAMIC MANAGEMENT OF MAINTENANCE ASSOCIATION MEMBERSHIP IN A COMPUTER NETWORK

TECHNICAL FIELD

The present disclosure relates generally to computer networks, and, more particularly, to membership of maintenance end-points (MEPs) within maintenance associations of computer networks.

BACKGROUND

In certain networks, such as Ethernet networks employing the connectivity fault management (CFM) protocol (e.g., IEEE standard 802.1ag-2007), each CFM maintenance end-point (MEP) is generally required to maintain a static list of remote MEPs that are expected to be members of the same Maintenance Association (MA). This static list may then be crosschecked against a dynamic list of MEPs that are learned by receiving continuity check messages (CCMs, periodically exchanged among MEPs in an MA), for the purpose of identifying missing MEPs (e.g., devices of a service that are expected but unresponsive) and unexpected MEPs (e.g., devices not expected to be part of the service).

Requiring these static remote MEP lists, for normal CFM operation, poses two operational challenges for service providers. First, during service bring-up, or when sites are added/removed for an existing service, unnecessary alarms may be generated if the static lists are not updated simultaneously on all MEPs. Second, when devices (MEPs) are added or removed for an existing service, the service provider not only has to configure the affected device, but also has to update the configuration of all other (remote) MEPs for the service in question. That is, the service provider must update the remote MEP lists of every existing MEP in the network (for that service) with the newly added or removed MEP (e.g., its MEP ID).

BRIEF DESCRIPTION OF THE DRAWINGS

The advantages of one or more embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
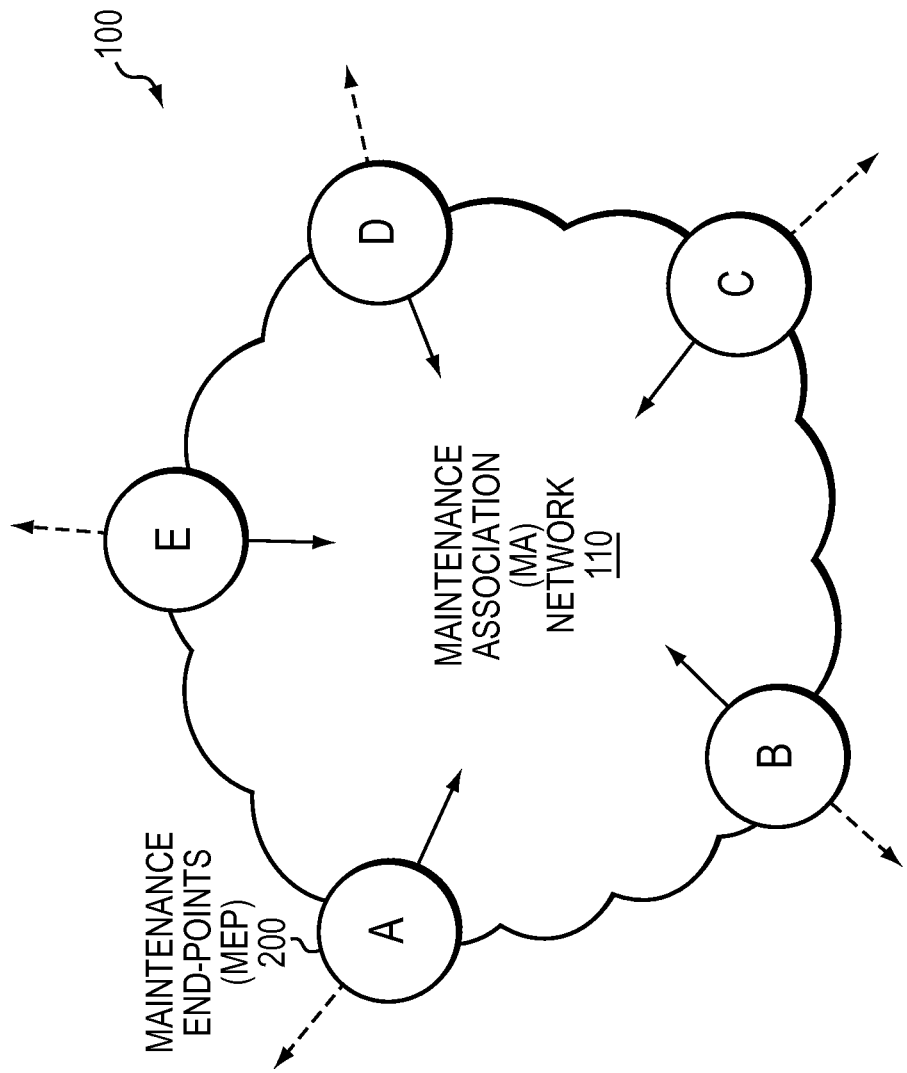
FIG. 1 illustrates an example computer network.

According to embodiments of the disclosure, a new maintenance end-point (MEP) may join a particular network (and initiate its sending of continuity check messages, "CCMs") by transmitting one or more join announcement messages (JAMs). When the JAMs are received by remote MEPs in the particular network, the new MEP may be added to a configured list of MEPs within the particular network at each remote MEP without an alarm. Also, a current MEP may leave the particular network (and cease its transmission of CCMs) by transmitting one or more leave announcement messages (LAMs), which request removal of the current MEP from the configured list at each of the remote MEPs without alarms. Otherwise, transmission of CCMs (that are not JAMs or LAMs) may result in alarms being generated by the MEPs in the particular network for unexpected MEPs or missing MEPs, accordingly.

Description

Network Architecture

A computer network typically comprises a plurality of interconnected entities. An entity may consist of any network device, such as a server or end station, that "sources" (i.e., transmits) or "sinks" (i.e., receives) data frames. A common type of computer network is a local area network ("LAN"), which typically refers to a privately owned network within a single building or campus. LANs typically employ a data communication protocol (LAN standard), such as Ethernet, FDDI or token ring, that defines the functions performed by the data link and physical layers of a communications architecture (i.e., a protocol stack).

One or more intermediate network devices are often used to couple LANs together and allow the corresponding entities to exchange information. For example, a bridge (or switch) may be used to provide a "bridging" (or "switching") function between two or more LANs. Typically, the bridge is a computer and includes a plurality of ports that are coupled to the LANs. Ports that are coupled to LANs that are, in turn, coupled to other bridges are generally referred to as a trunk ports, whereas ports used to couple bridges through LANs to end stations are generally referred to as access ports. The bridging function includes receiving data from a sending entity at a source port and transferring that data to at least one destination port for forwarding to a receiving entity.

Although bridges may operate at various levels of the communication protocol stack, they typically operate at Layer-2, which, in the OSI Reference Model, is called the data link layer and includes the Logical Link Control (LLC) and Media Access Control (MAC) sub-layers. Data frames at the data link layer typically include a header containing the MAC address of the entity sourcing the message, referred to as the source address, and the MAC address of the entity to which the message is being sent, referred to as the destination address. To perform the bridging function, Layer-2 bridges examine the MAC destination address of each data frame received on a source port. The frame is then switched onto the destination port(s) associated with that MAC destination address.

Other devices, commonly referred to as routers, may operate at higher communication layers, such as Layer-3 of the OSI Reference Model, which in Transmission Control Protocol/Internet Protocol (TCP/IP) networks corresponds to the Internet Protocol (IP) layer. Packets at the IP layer also include a header, which contains an IP source address and an IP destination address. Routers or Layer-3 switches may re-assemble or convert received data frames from one LAN standard (e.g., Ethernet) to another (e.g. token ring). Thus, Layer-3 devices are often used to interconnect dissimilar subnetworks.

FIG. 1 is a schematic block diagram of an example computer network 100 illustratively comprising nodes/devices, such as bridges "A-E" (e.g., each hosting one or more maintenance end points or "MEPs") interconnected by a particular network 110 as shown (e.g., a maintenance association or "MA" having links, other devices, and/or maintenance intermediate points or "MIPs" not explicitly shown). Those skilled in the art will understand that any number of nodes, devices, links, etc. may be used in the computer network, and that the view shown herein is for simplicity. Also, while the embodiments described herein are described generally with regard to maintenance networks, they may apply to any suitable network. Further, those skilled in the art will understand that a "maintenance association" generally implies all particular MEPs that are part of a same maintenance domain (e.g., which is comprised of all devices owned and operated by an entity/organization, such as a service provider or an enterprise) and a same service, though as used herein may illustratively be referred to simply as a "network" that is comprised of the particular MEPs. The computer (e.g., bridged) network 100 of FIG. 1 is meant for illustration purposes only and is not meant to limit the embodiments described herein.

Figure 2:
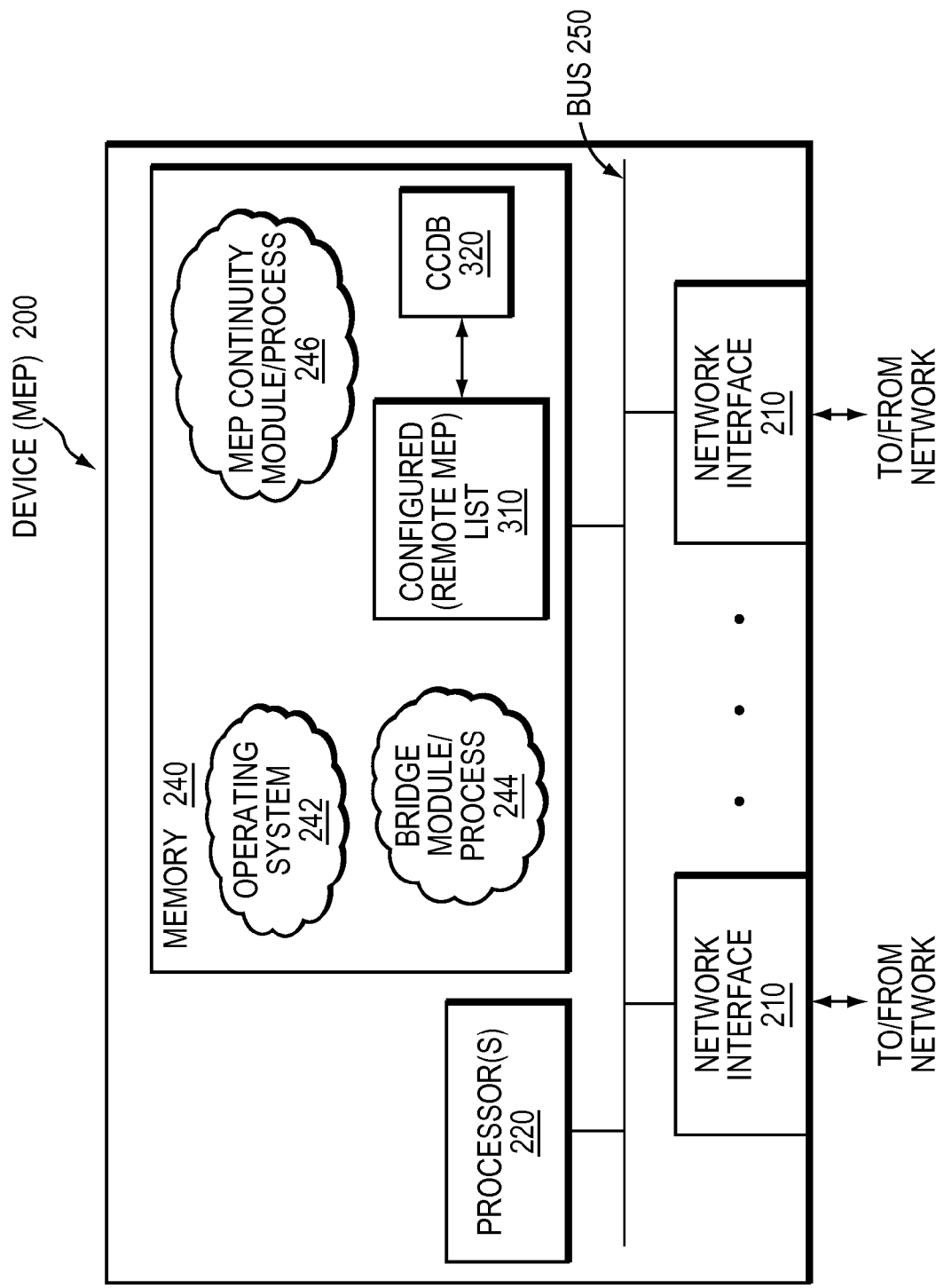
FIG. 2 illustrates an example network device/node.

FIG. 2 is a schematic block diagram of an example node/device 200 that may be advantageously used with one or more embodiments described herein, e.g., as a bridge (or MEP, where, notably, a MEP may be a particular instance of a network element/bridge, e.g., one of a plurality of MEPs hosted by the bridge. However, as used herein, the terms are substantially interchangeable). The device comprises a plurality of network interfaces or ports 210 (e.g., hosting the MEPs), one or more processors 220, and a memory 240 interconnected by a system bus 250. The network interfaces/ports 210 contain the mechanical, electrical, and signaling circuitry for communicating data over physical links coupled to the network 100. The network interfaces/ports may be configured to transmit and/or receive data (frames) using a variety of different communication protocols over physical links or wireless links, for instance with the communication with other MEPs of an MA 110, as will be appreciated by those skilled in the art. For example, such communication protocols may include, inter alia, TCP/IP, UDP, ATM, synchronous optical networks (SONET), wireless protocols (e.g., IEEE Std. 802.11), Frame Relay, Ethernet (e.g., IEEE Std. 802.3), Fiber Distributed Data Interface (FDDI), etc. Notably, a network interface/port 210 may also be used to implement one or more virtual network interfaces, such as for Virtual Private Network (VPN) access or Virtual LANs (VLANs) (e.g., which may also each have an associated MEP on a the given port), as will be understood by those skilled in the art. Illustratively, the handling of frames within the network interfaces/ports 210 may conform to a protocol stack (not shown) that defines the functions performed by the data link and physical layers of a communications architecture.

The memory 240 comprises a plurality of storage locations that are addressable by the processor(s) 220 and the network interfaces/ports 210 for storing software programs and data structures associated with the embodiments described herein. The processors 220 may comprise necessary elements or logic adapted to execute the software programs and manipulate the data structures, such as a configured (remote MEP) list 310 and a continuity check database (CCDB) (detected list) 320, as described herein. An operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the device. It will be apparent to those skilled in the art that other types of processors and memory, including various computer-readable media, may be used to store and execute program instructions pertaining to the inventive technique described herein.

Portions of the device 200 may be organized as particular components or modules that are configured to perform various processes and/or services for the device. For instance, these components or modules may be hardware, software, firmware, logic (e.g., on an application-specific integrated circuit or "ASIC"), etc., depending upon implementation and functionality, as may be appreciated by those skilled in the art. For example, certain processes and/or services as used herein may comprise an illustratively simplified "bridge module" (or "bridge process") 244, along with an illustrative MEP continuity (or "maintenance") module/process 246, as described herein (both shown stored/executed within memory 240 as one example implementation).

Bridge module/process 244 contains computer executable instructions executed by the processor(s) 220 to perform various functions relating to bridges in general, as may be appreciated by those skilled in the art. For instance, a communication process/service of bridge module process 244 may perform functions provided by one or more communication protocols, such as various switching/bridging protocols. These functions may be configured to manage switching databases (e.g., spanning tree instances), filtering databases (FDBs), or forwarding information databases (FIBs) containing, e.g., data used to make switching/forwarding decisions. In particular, as part of communication process/services, a spanning tree process may execute to perform functions provided by one or more spanning tree protocols (STPs), such as the known Rapid STP (RSTP) and/or Multiple STP (MST). Illustratively, RSTP and MST may be employed on the network devices (bridges) to establish and maintain one or more spanning tree instances, converging the network in response to topology changes.

MEP continuity (maintenance) module/process 246 contains computer executable instructions executed by the processor(s) 220 to perform various functions relating to network maintenance/management in general, as may be appreciated by those skilled in the art, and in accordance with the novel techniques described herein. In particular, with regard to service OAM (operation, administration, and management), the IEEE Std. 802.1ag-2007 describes Connectivity Fault Management (CFM) protocols that work together to help administrators debug networks, e.g., Ethernet networks. These protocols include, among other things, a continuity check protocol, a loopback protocol, and a linktrace protocol.

Notably, Ethernet CFM, within any given service provider network, relies on a functional model consisting of hierarchical maintenance domains, which are administrative domains for the purpose of managing and administering a network. Generally, maintenance domains may nest or touch, but cannot intersect. If two domains nest, the outer domain must have a higher maintenance level than the one it engulfs. A maintenance domain is defined by provisioning which bridge ports are interior to the domain. For instance, as shown in FIG. 1, interior ports are shown interconnected with solid lines, while exterior ports are shown with dotted lines. The concept of maintenance domains is important due to the different scopes of management that must be provided for different organizations, such as customers, service providers, and operators, as will be understood by those skilled in the art. Moreover, any port 210 of a bridge 200 can be configured as a maintenance point (e.g., MEP or MIP, or a "transparent point" as defined in the protocol). MEPs reside at the edge of a maintenance domain, whereas MIPs are internal to the domain. Hence, an MIP will forward CFM packets (unless it is a CFM message destined for that MIP), while MEPs do not forward CFM packets because they must keep them within the domain. (The only exception to this is when an MEP is also acting as an MIP for a higher-level domain—in which case it will forward CFM packets as long as they are part of the higher-level domain.) Those skilled in the art will understand that while Ethernet CFM networks are described, other computer networks using other manageability models may be used herein, having a domain defined by edge/end and intermediate nodes, accordingly.

As noted, the CFM protocol is an Ethernet service layer OAM protocol that provides: discovery and verification of the paths, through bridges and local area networks (LANs), taken for frames addressed to and from specified network nodes; detection of connectivity faults on the communication links that form the paths; and isolation of the connectivity faults to specific bridges or LANs. In particular, the continuity check portion of the protocol describes how "heartbeat" messages (continuity check messages or "CCMs") may be issued periodically by maintenance end-points (MEPs) to allow MEPs to detect a loss of service connectivity amongst themselves and to allow MEPs and maintenance intermediate points (MIPs) to discover MEPs within a domain.

While the CFM protocol provides the OAM functions in terms of fault management and connectivity monitoring, the CFM protocol is provisioning-intensive because it requires manual configuration of an extensive list of parameters on every network node that is included in a CFM maintenance association. For example, in order to provision the CFM protocol for a CFM association that includes multiple network elements, a user or application must log in to each network element and must configure the necessary CFM parameters on each network element. Some examples of the CFM parameters that must be configured on each network element include a maintenance level, a maintenance association identifier, a maintenance endpoint identifier for the local network element, and the list of the MEP identifiers (IDs) of all other network elements that participate in (are "members" of) the CFM association (a maintenance association or "MA").

For a CFM association that includes a large number of network elements, configuring the CFM protocol is a significant problem because each network element must be configured not only with its own CFM parameters, but also with CFM parameters that pertain to all other network elements that participate in the association. This problem is further exacerbated by the fact that the CFM protocol does not itself provide a mechanism for automatically maintaining the intended set of network elements that participate in an already established and functioning CFM association. Rather, when a network element is added to or is taken out of a CFM association for whatever reason, a user must manually reconfigure each and every other network element that participates in that CFM association. This manual maintenance of the set of network elements that participate in a CFM association is a tedious, error-prone, and time-consuming task, especially for CFM associations which include a large number of network elements and/or which experience frequent topology changes.

In addition, as noted above, the static (configured) list of remote MEPs that are expected to be members of the same MA is crosschecked against a dynamic list of MEPs that are learned by receiving the continuity check messages (CCMs), for the purpose of identifying missing MEPs (e.g., devices of a service that are expected but unresponsive) and unexpected MEPs (e.g., devices not expected to be part of the service). The manual configuration of CFM parameters on the devices poses problems during service start-up (where all MEPs must be configured simultaneously to avoid alarms) or when adding or removing a MEP from an existing service (where all of the other MEPs must be "touched" to manually re-configure the static list). Very few service providers may use network element management systems (EMS) with a distributed configuration mechanism that is capable of updating the configuration of all MEPs (that are part of a given service) at the same point of time. However, since most typical service provider networks do not use such a mechanism, the service providers encounter false alarms during initial service bring-up (start-up) and whenever they add/remove sites for an existing service.

Figure 3:
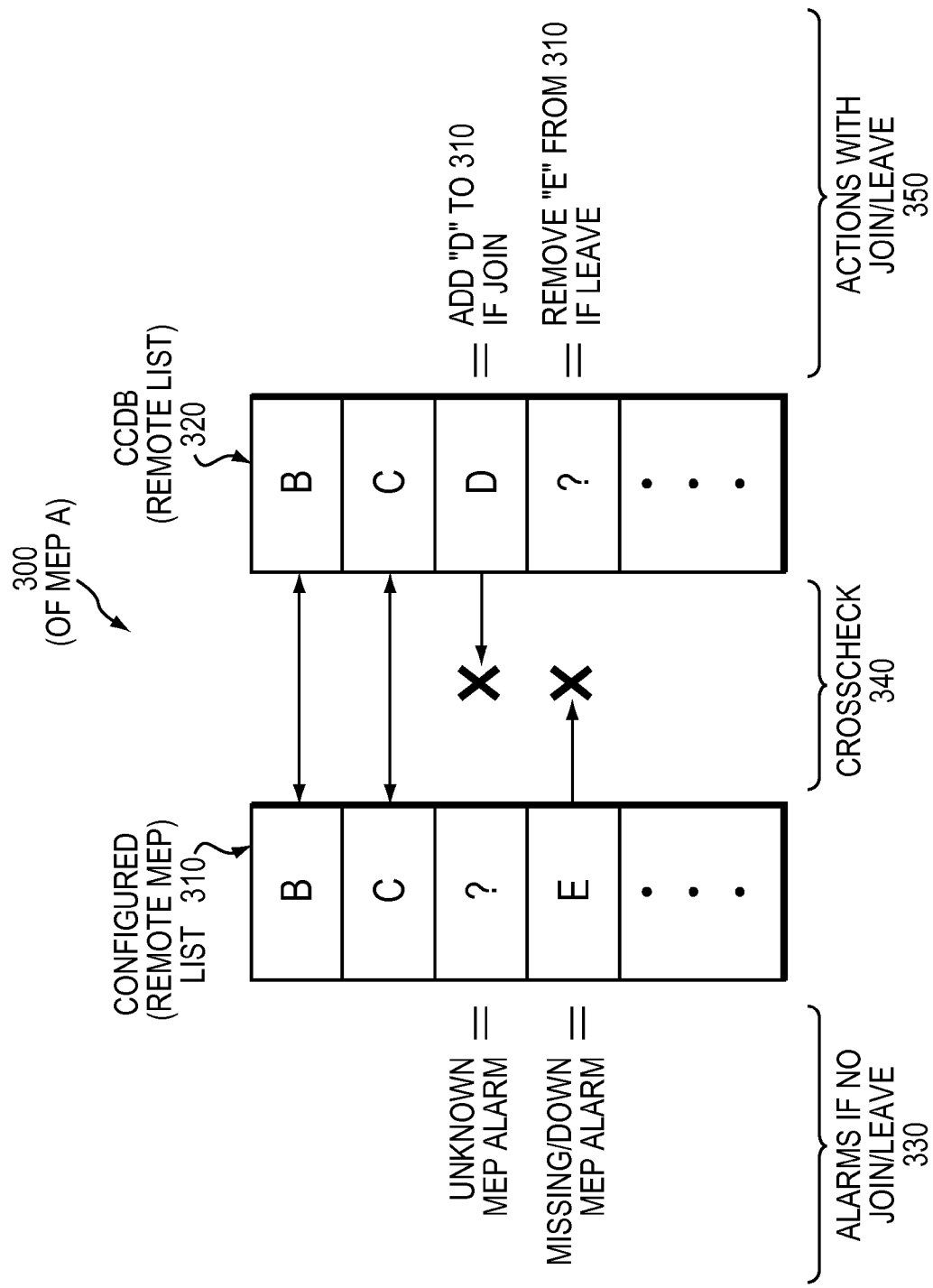
FIG. 3 illustrates an example list arrangement.

For instance, FIG. 3 illustrates an example arrangement 300 of a configured (remote MEP) list 310 and a CCDB (detected list) 320, from the perspective of MEP "A". (Those skilled in the art will appreciate that the view 300 is a very simplified illustration of the two lists as they are generally used for continuity checking, e.g., as part of the CFM protocol mentioned above.) In particular, as mentioned, each MEP 200 maintains a static list 310 of other remote MEPs from which it expects to receive CCMs, for a given service (e.g., for MA 110). This list 310 is crosschecked (340) against the dynamically learned MEPs in the CCDB 320, for the purpose of identifying missing MEPs (resulting in a missing MEP alarm 330 or "DefRemoteCCM" alarm, per the protocol) and unexpected MEPs (resulting in an unexpected MEP alarm 330 or "DefErrorCCM" alarm per the protocol). Assume, for example, that MEP "D" has been added to the service before MEP A is aware of the addition (that is, MEP D appears in CCDB 320 prior to configured list 310). MEP A will thus issue an unexpected MEP alarm upon receiving a CCM from MEP D. Conversely, assume that MEP "E", which is already in configured list 310, stops sending CCMs (so that an entry in CCDB 320 no longer appears), then MEP A will issue a missing MEP alarm, accordingly.

Dynamic Maintenance Association Membership

As described herein, the need to update configuration of existing MEPs may be alleviated when a new MEP is being added to or removed from an MA, and unnecessary alarms may be effectively eliminated during service start-up or modification. Generally, the techniques herein describe a manner in which the CFM Continuity Check Protocol may be extended for dynamically building and modifying the Remote MEP lists 310. Accordingly, there is no longer a need to manually configure every MEP with the MEP IDs of all other MEPs that are members of the same MA.

In particular, according to one or more embodiments described herein, a new MEP may join a particular network (and initiate its sending of continuity check messages, "CCMs") by transmitting one or more join announcement messages (JAMs). When the JAMs are received by remote MEPs in the particular network, the new MEP may be added to a configured list of MEPs within the particular network at each remote MEP without an alarm. Also, a current MEP may leave the particular network (and cease its transmission of CCMs) by transmitting one or more leave announcement messages (LAMs), which request removal of the current MEP from the configured list at each of the remote MEPs without alarms. Otherwise, transmission of CCMs (that are not JAMs or LAMs) may result in alarms being generated by the MEPs in the particular network for unexpected MEPs or missing MEPs, accordingly.

Illustratively, the techniques described herein may be performed by hardware, software, and/or firmware, such as in accordance with a MEP continuity process/module 246, which may contain computer executable instructions executed by the processor 220, or may be hardware, firmware, or logically implemented to perform functions relating to the novel techniques described herein, e.g., to operate in a "joining phase," an "operational phase," and a "leaving phase," as described herein. For instance, when a MEP is first enabled, it announces itself within its MA (e.g., to the other MEPs of the MA), and indicates that it wishes to join the MA, and the receiving MEPs add the announcing (new) MEP to their Remote MEP list 310. For example, referring again to FIG. 3, MEP D may announce itself through a join announcement message (JAM) within the MA, such that the receiving MEPs (e.g., MEP A) may receive the JAM, and instead of generating an alarm, may add (portion 350) the new MEP D to the configured (remote MEP) list 310. After the join announcements, normal ("regular") CCM operation may commence. Also, when MEP is about to be disabled ("decommissioned"), e.g., MEP E, it may announce to rest of the MEPs in its MA that it is about to leave the MA (a leave announcement message, "LAM"), such that the receiving MEPs (e.g., MEP A) remove (portion 350) the announcing MEP from their Remote MEP list 310. Note that post modification to the configured lists 310, a service provider (e.g., an administrator or management process/application) may visit each MEP to verify the updated lists (e.g., notably simpler than going to each one to configure the lists individually).

Figure 4:
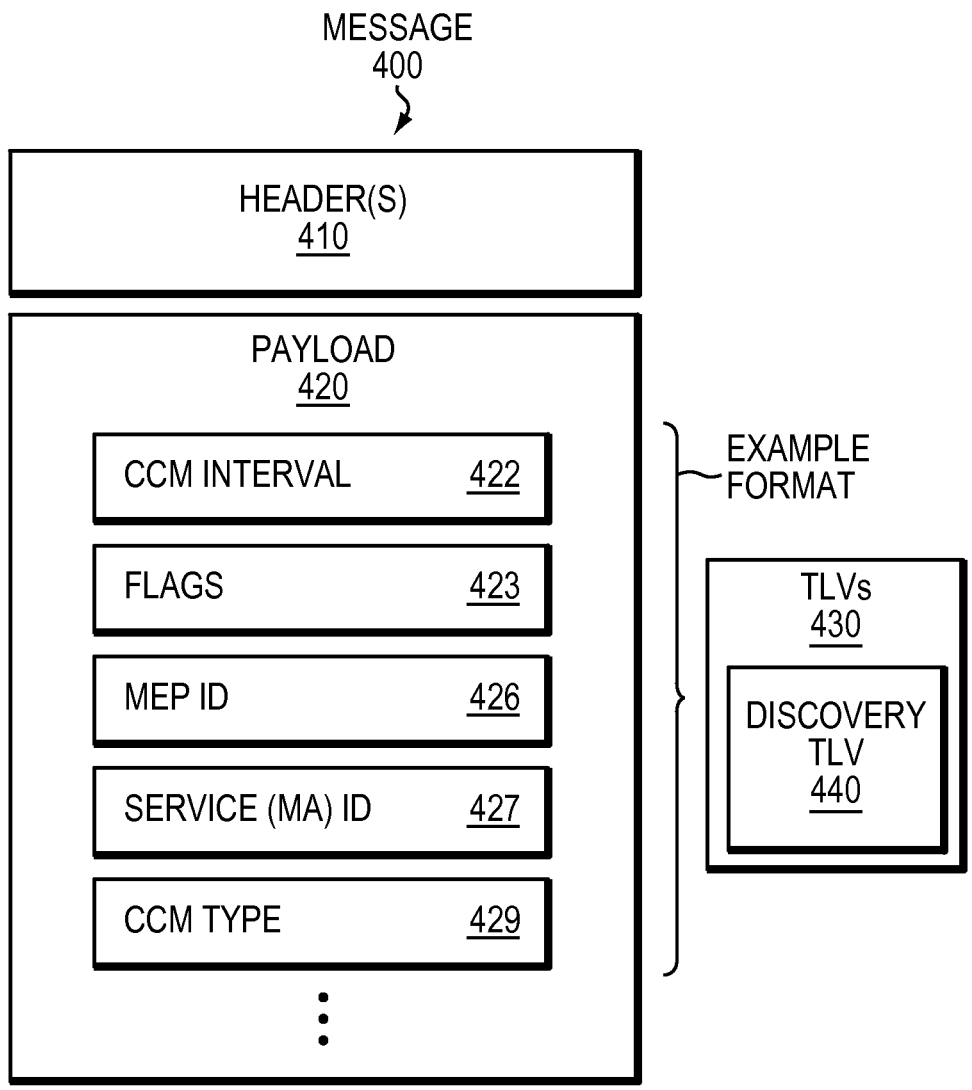
FIG. 4 illustrates an example continuity check message.

FIG. 4 illustrates an example message 400 that may be a continuity check message (CCM) and/or a JAM or LAM in accordance with one or more embodiments described herein (note that while an example format is shown, other formats carrying similar applicable information may be used). The illustrative message 400 may include a header 410 and a payload 420, as may be appreciated by those skilled in the art. Payload 420 may comprise a number of fields for carrying various information, such as a CCM interval 422, flags 423, MEP ID 426, a service ID 427, and a CCM type 429. Notably, payload 420 may be arranged as one or more TLVs (type, length, value objects) 420 and sub-TLVs, such as a discovery TLV 440, which may be adapted to carry various specific information of payload 420 (e.g., the MEP ID, service ID, and CCM type, as one example.)

The message 400 may generally be referred to as a CCM, however according to certain embodiments, the join (JAM) and leave (LAM) announcements may be encoded into CCMs, such as through setting one or more flags 423 (e.g., signaling a join, leave, or "in MA" status). Alternatively, the CCM interval field, which generally indicates a time between CCMs, may be set to "0" (or other typically invalid value), such that a receiving MEP, which understands the CCM interval "0", may allow the MEP to quickly identify that this is a specific kind of frame (e.g., a "discovery". That is, since setting the CCM=0 is not valid, if a MEP does not understand the special value, it may simply ignore the message, but if configured to understand such a message, may disable its alarms, and look directly to a specified MA discovery TLV field (e.g., vendor specific) with an appropriate CCM type field 429 to discover whether the message is a JAM or LAM, without having to parse through the rest of the message 400 (e.g., other TLVs).

Figure 5:
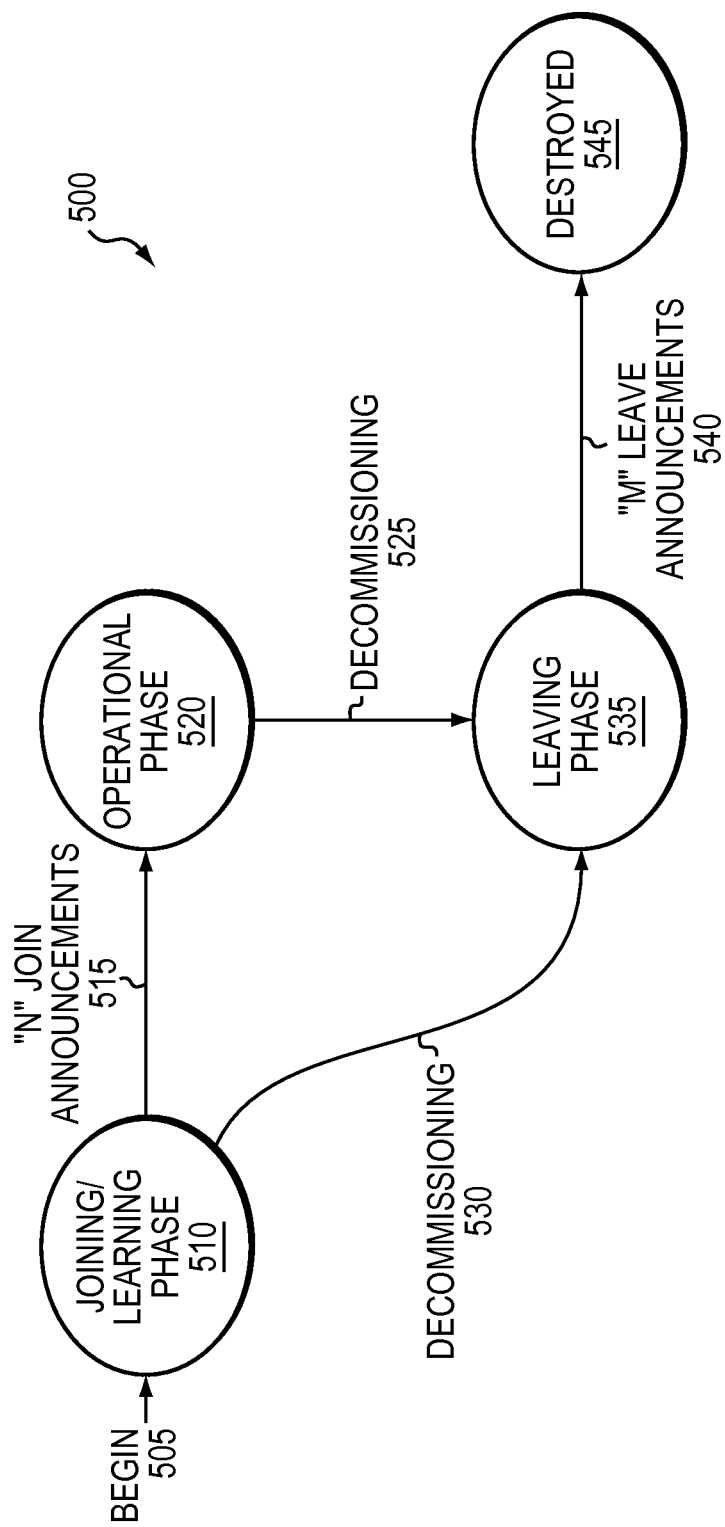
FIG. 5 illustrates an example state diagram for dynamically managed maintenance end-points.

In addition, as further described below, FIG. 5 illustrates an example state diagram 500 of the various phases in which a MEP may operate according to one or more techniques described herein. For example, a MEP may begin (505) in phase 510, a "joining phase," which, after "N" periodic join messages are sent (or after a configured time period) 515, may transition to an operational phase 520, where all alarms are in full effect (e.g., per the CFM standard). Join phase 510 may also be referred to as a "learning phase" (in certain embodiments), where any CCMs (regular or JAMs) received at the joining MEP cause sending MEP to be added to the configured (Remote MEP) list 310 at the joining MEP (and any MEP sending a leave message is removed from the list), while unexpected MEP (and MEP Down) alarms are suppressed. A MEP may leave either the joining phase 510 or the operation phase 520 through decommissioning (530 or 525, respectively) into the leaving phase 535, where one or more leave messages (LAMs) may be sent to announce the departure of the MEP. After the leaving phase 535 (e.g., after "M" LAMs or time period), the MEP is destroyed (545), i.e., decommissioned (removed from the service/MA).

Operationally, while in a joining phase 510 (e.g., for either a single site/MEP start-up or for the entire service, i.e., all sites), when a MEP is first enabled for CCM transmission, it enters the joining phase and then announces to the rest of the MEPs in the MA that it wishes to join that MA. This may be accomplished by encoding a join announcement message (JAM) into the CCMs transmitted by that MEP (e.g., MEP D) to request addition of the particular joining/new MEP to the configured list 310 of the MEPs within the MA 110 without alarms. The new MEP may continue sending JAMs over multiple (e.g., N=3) CCM transmission intervals, e.g., to account for potential loss of frames in the network.

According to one optional arrangement of the joining phase, the joining MEP may have its configured (remote MEP) list 310 configured with the other MEPs in the MA (e.g., A-C and E) prior to entering the joining phase (e.g., by interfacing with MEP continuity module manually or by an application/process). Conversely (or in addition), the joining MEP may be arranged to suppress all alarms, and may learn of the remote MEPs during the joining phase. For instance, when a MEP is in the joining phase, it may receive CCMs from other MEPs, and adds all other MEPs from which it receives regular CCMs or JAMs to its own configured (Remote MEP) list 310, while suppressing its alarms. (In addition, the MEP may remove from its list 310 any remote MEP that is sending leave announcements, LAMs). In at least this arrangement, the configured list 310 of the joining MEP may be confirmed after the joining phase (e.g., by interfacing with MEP continuity module/process 246), in order to ensure that proper MA configuration has occurred (for reasons as described above).

Upon conclusion of the joining phase (e.g., post transmission of N JAMs or after a time period), the joining MEP may begin sending regular CCMs to the other MEPs in the MA, and re-enables its CCM-based alarms for an operational phase 520. A MEP in operational mode may maintain its configured (remote MEP) list 310 in a conventional manner for regular CCMs. For instance, upon receiving a CCM from a remote MEP that is in the configured list 310, the information from that remote MEP's CCM may be catalogued in the CCDB 320 (e.g., per standard operation under IEEE Std. 802.1ag). On the other hand, if a MEP receives a regular CCM from a remote MEP that is not in its configured list 310, it generates an unexpected MEP alarm (e.g., per standard operation). Also, if a CCM is not received from a remote MEP that is in the configured list 310, then a missing MEP alarm may be generated for that missing MEP (e.g., per standard operation).

In addition to standard operation, however, and in accordance with one or more embodiments described herein, in the event that a MEP receives a CCM from a remote MEP that is a JAM (join announcement), then the receiving MEP adds the remote MEP (e.g., its MEP ID) to its configured (Remote MEP) list 310 for the particular MA 110, notably without generating an unexpected MEP alarm (or other alarms). Illustratively, the CCM 400 carries the service ID (or MA ID) 427, so a crosscheck would still generate an alarm if the service ID is wrong (i.e., is for an unsupported MA). In this manner (e.g., checking and comparing the service ID to that of the MA, e.g., that of the receiving MEP), the receiving MEP may confirm that the remote MEP of the JAM is in the correct service and domain (MA) prior to adding the remote MEP to its configured list.

Further, in the event that a MEP receives a CCM from a remote MEP that is a LAM (leave announcement), then the receiving MEP removes the remote MEP (e.g., its MEP ID) from its configured (Remote MEP) list 310 for the particular MA 110, and flushes the corresponding entry in CCDB 320 for that MEP. Again, the removal of the remote MEP from the configured list in response to a LAM does not generate any alarms (e.g., the missing MEP alarm), such that when the remote MEP ceases transmission of ay CCMs (or LAMs), there is no longer an entry in the configured list 310 for an expected MEP.

As noted above for the learning phase (or joining phase 510), the configured lists 310 may be subsequently confirmed at each MEP 200 of the MA 110. For example, the lists may be confirmed by interfacing with the MEP continuity module/process 246, either manually by a system administrator, or through a management application that accesses and confirms the configured lists of the MEPs. For instance, the confirmation may occur periodically, or in response to a trigger, such as a manual trigger or in response to either adding a MEP to the MA or removing a MEP from the MA. In this manner, as mentioned above, the integrity of the MA is maintained, while at the same time alleviating the need to modify each MEP's configuration (e.g., simultaneously) and without generating unnecessary alarms.

Lastly, when a service or site/MEP is being brought/shut down, it may enter the leaving phase (535). In particular, when a MEP is to be decommissioned (e.g., MEP E), it announces to the rest of the MEPs in its MA that it intends to leave the MA. Specifically, regular CCM transmission is disabled (ceased), and a burst of M (e.g., M=3) CCMs set as a LAM may be sent into the MA to request removal of the particular leaving MEP from the configured list 310 at each of the other MEPs without alarms. Multiple copies of the LAM may, though need not, be sent to ensure that far away MEPs within the LAM receive at least one copy of the LAM. As noted above, the MEPs receiving these announcements remove the associated MEP (e.g., its MEP ID) from their configured (Remote MEP) list 310. The leaving MEP may then be decommissioned (destroyed state 545) without having generated any unnecessary alarms during its departure from the MA.

Figure 6:
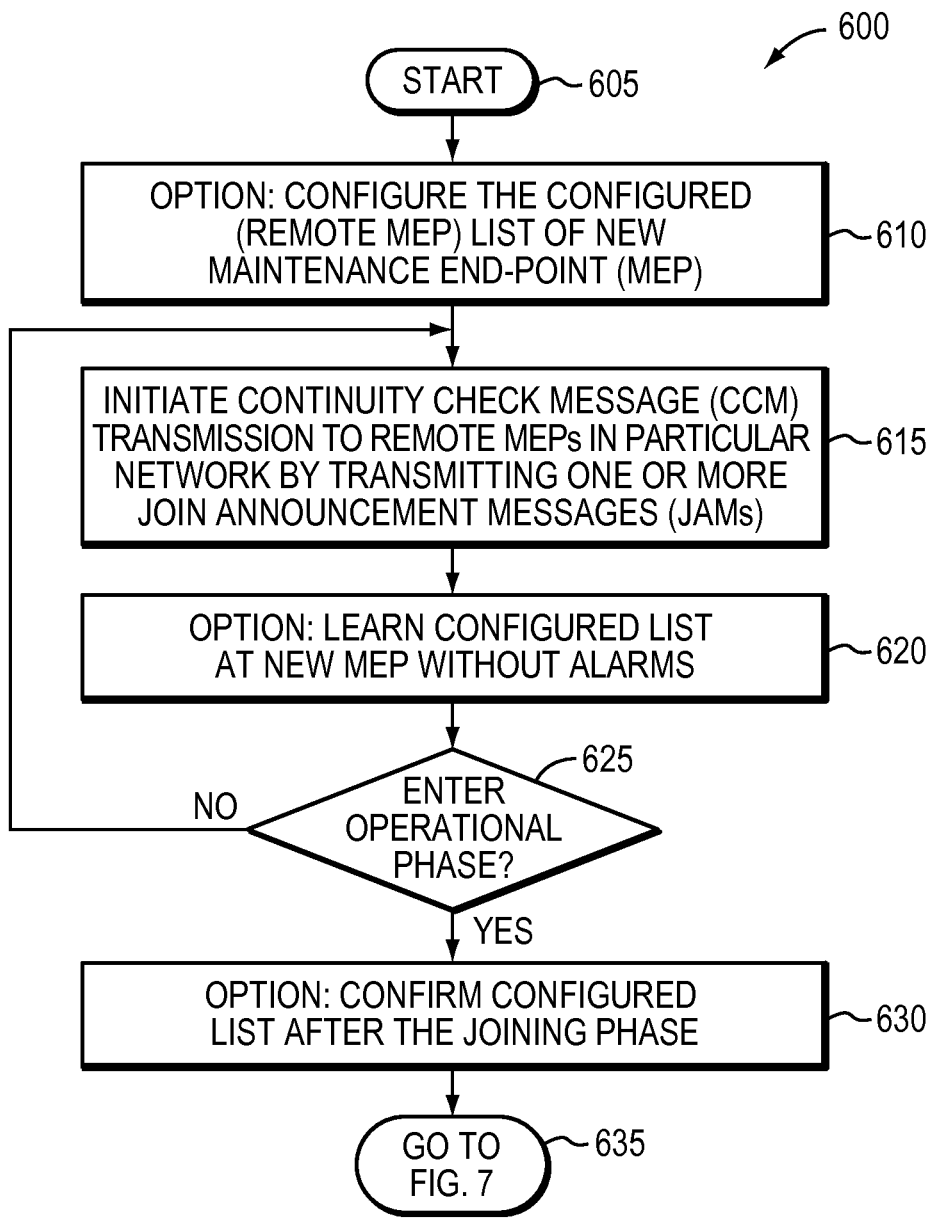
FIG. 6 illustrates an example procedure for joining a maintenance association.
Figure 7:
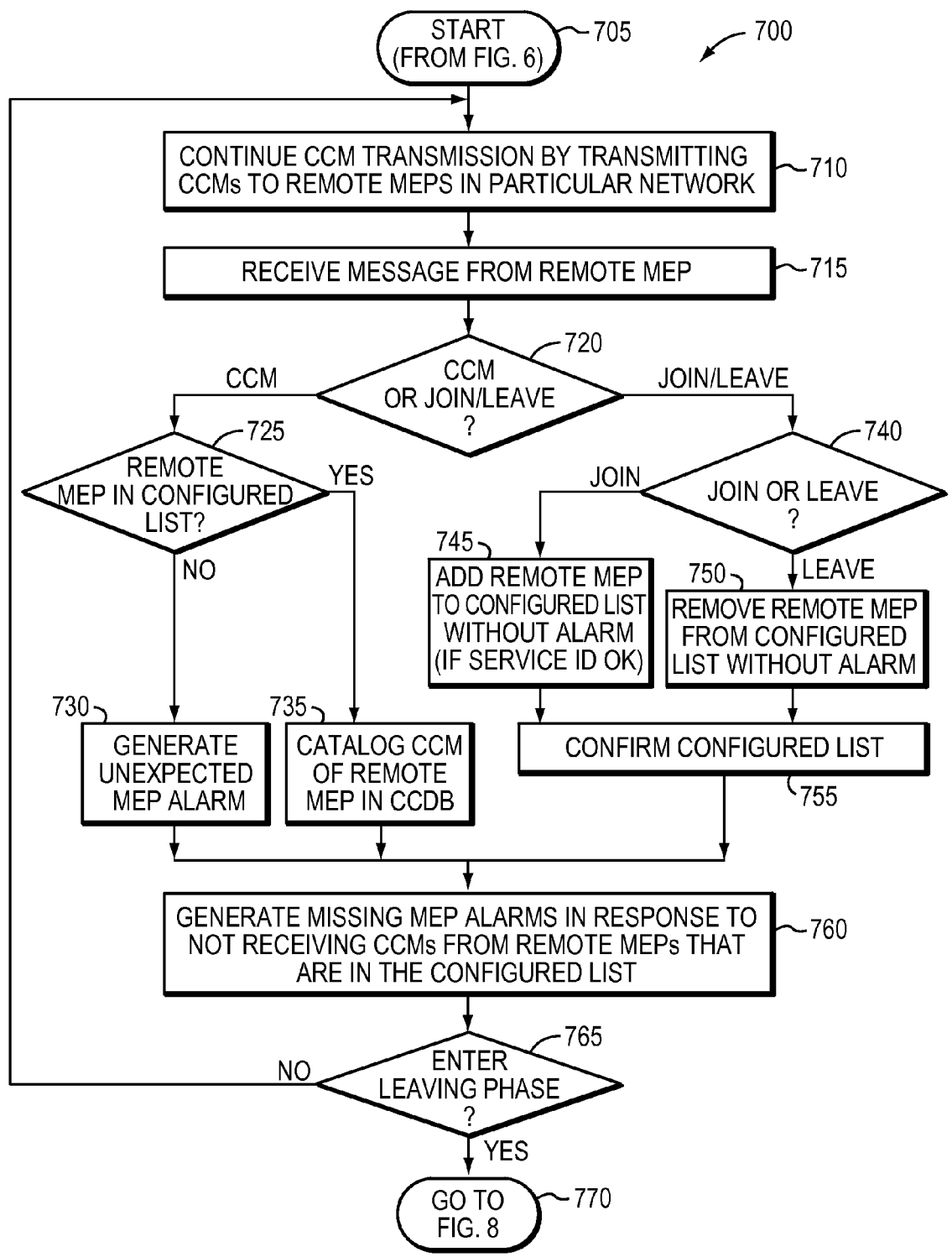
FIG. 7 illustrates an example procedure for operating within a maintenance association.
Figure 8:
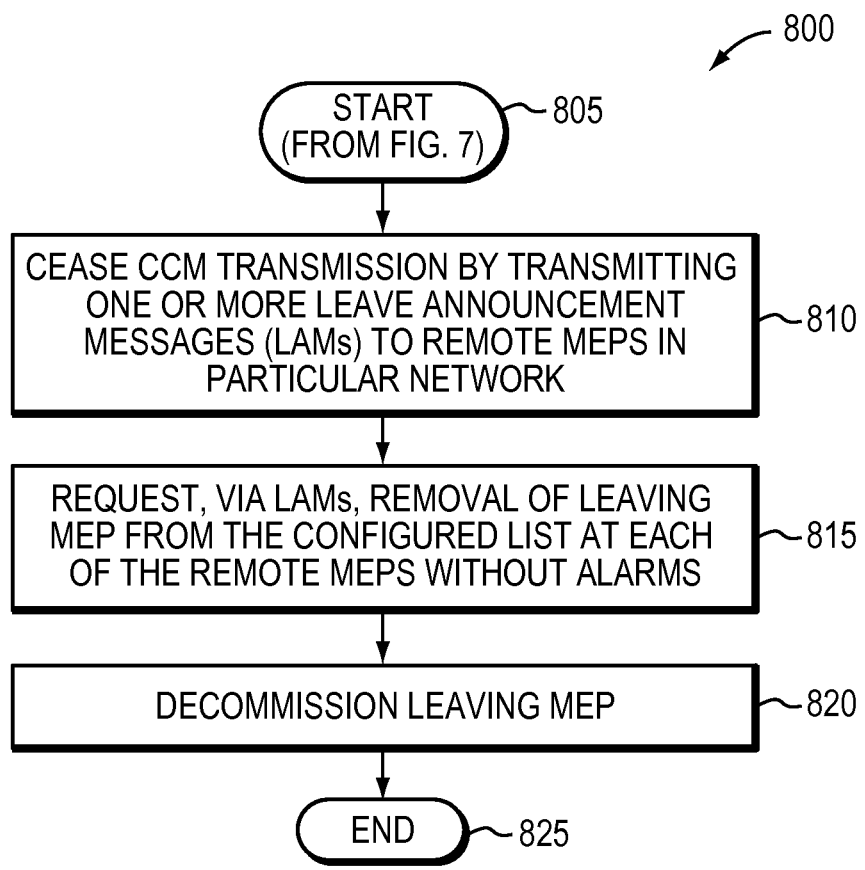
FIG. 8 illustrates an example procedure for leaving a maintenance association.

FIGS. 6-8 illustrate MEP operation according to the example MEP states as described above. In particular, FIG. 6 illustrates an example procedure for a MEP 200 (e.g., MEP D) to join an MA 110 in accordance with one or more embodiments described herein (e.g., "joining phase"). The procedure 600 starts at step 605, and continues to step 610, where, in one optional arrangement, the configured (remote MEP) list 310 of a new MEP D may be configured, e.g., populated with all other remote MEPs in the desired MA 110 (e.g., A-C and E). In step 615, the new MEP may initiate CCM transmission to the remote MEPs in the particular network (MA 110) by transmitting one or more JAMs 400 as described above. During the joining phase, in an alternative optional arrangement, the new MEP may learn the configured list 310 (without alarms) in step 620 by receiving incoming CCMs from the other remote MEPs, accordingly. When it is time to enter operational phase in step 625 (e.g., after "N" JAMs have been transmitted), then, optionally, the configured list 310 may be confirmed in step 630 to determine whether proper learning has taken place in step 620 above. The procedure 600 for the join phase then ends in step 635, transitioning to the operational phase described in FIG. 7.

Specifically, FIG. 7 illustrates an example procedure for operating a MEP 200 in an MA 110 in accordance with one or more embodiments described herein (e.g., "operational phase"). The procedure 700 starts at step 705 (e.g., after completing the join phase of FIG. 6), and continues to step 710, where a MEP may continue CCM transmission by transmitting CCMs to remote MEPs in its particular network (its MA 110). Upon receiving a message in step 715 from a remote MEP, each MEP may determine in step 720 whether the message is a CCM or a join/leave message (e.g., based on the CCM interval being zero or non-zero or otherwise). If the message is a "regular" CCM message, then the receiving MEP determines in step 725 whether the remote MEP of the CCM is within the configured (remote MEP) list 310. If not, in step 730, then an unexpected MEP alarm may be generated, while if so, in step 730, the receive CCM for the remote MEP may be catalogued in step 735 in the CCDB (detected list) 320.

If, on the other hand, the received message is a join or leave message in step 720, then in step 740 it may be further determined whether it is a join message (JAM) or leave message (LAM). In response to a JAM, then in step 745 the remote MEP of the JAM may be added to the configured list 310 without an alarm (e.g., assuming that the service ID is correct, as mentioned above). Conversely, in response to a LAM, then in step 750, the remote MEP of the LAM may be removed from the configured list 310, also without an alarm. In either event, as noted above, the configured list 310 may be confirmed later in step 755, such as manually or by a dynamic inspection process, to ensure that the addition or removal was, in fact, proper.

Also, according to continuity procedure, if a CCM is not received in step 760 from remote MEPs that are in the configured list, then a missing MEP alarm may be generated. If at any time during the operational phase (procedure 700) it is determined that the MEP is to be decommissioned, and is thus entering the leaving phase in step 765, then the procedure 700 ends in step 770, and the MEP may corresponding enter the leaving phase according to the procedure described in FIG. 8 below. Otherwise, the procedure 700 for the operational phase may continue to transmit and receive messages as described above.

FIG. 8, then, illustrates an example procedure for a MEP 200 (e.g., MEP E) to leave an MA 110 in accordance with one or more embodiments described herein (e.g., "leaving phase"). The procedure 800 starts at step 805 (e.g., after exiting the operational phase of FIG. 7, such in response to a manual/dynamic shut-down), and continues to step 810, where CCM transmission may be ceased by transmitting one or more LAMs 400 to remote MEPs (e.g., A-D) in the particular network (e.g., MA 110). In particular, as described above, the LAMs (in step 815) request removal of the leaving MEP E from the configured (remote MEP) list 310 (and from CCDB 320) at each of the remote MEPs without alarms. After the one or more (e.g., "M") LAMs are transmitted, the leaving MEP E may be decommissioned (destroyed) in step 820, and the procedure ends in step 825, notably, with the ability to return to procedure 600 of FIG. 6 for the leaving MEP to re-enter (join) the MA at a later time.

Advantageously, the novel techniques described herein dynamically manage MEP membership in MAs of a computer network. By extending continuity check protocols (e.g., IEEE 802.1ag) for dynamic discovery of MA membership as described above, the novel techniques substantially eliminate false alarms during service modifications, while at the same time also alleviating the need to configure all MEPs of a service when a single MEP is added or removed from the service. In particular, the dynamic aspects of one or more embodiments described herein alleviate the need for cumbersome and inefficient manual configuration. Also, the techniques described above may be applied to native Ethernet networks as well as virtual private local area network (LAN) service (VPLS) networks (for which the network interfaces 210 are adequately adapted). Further, the techniques above are independent of the device's role in the network (e.g. U-PE, N-PE, PE-AGG, etc.), and are also independent of the MEP direction, each as may be appreciated by those skilled in the art.

While there have been shown and described illustrative embodiments that dynamically manage MEP membership in MAs of a computer network, it is to be understood that various other adaptations and modifications may be made within the spirit and scope of the present disclosure. For example, the embodiments have been shown and described herein relating to the CFM protocol and related terms. However, the embodiments of the disclosure in their broader sense are not so limited, and may, in fact, be used with other suitable management protocols, and the CFM terms (e.g., MEP, MA, CCM, etc.) are merely descriptive examples that will be understood those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
maintaining, at a particular maintenance end-point (MEP) of a particular network, a configured list of MEPs within the particular network;
in response to receiving, at the particular MEP, a join announcement message (JAM) from a first remote MEP not in the configured list that requests addition of the first remote MEP to the configured list without an unexpected MEP alarm, adding the first remote MEP to the configured list without alarm;
processing one or more received continuity check messages (CCMs) from the first remote MEP that has been added to the configured list; and
in response to receiving, at the particular MEP, a leave announcement message (LAM) from a second remote MEP in the configured list that requests removal of the second remote MEP from the configured list without a missing MEP alarm, removing the second remote MEP from the configured list without alarm.

2. The method as in claim 1, further comprising:
in response to receiving, at the particular MEP, a continuity check message (CCM) from a third remote MEP not in the configured list, generating an unexpected MEP alarm for the third remote MEP; and
in response to not receiving, at the particular MEP, a CCM from a fourth remote MEP that is in the configured list, generating a missing MEP alarm for the fourth remote MEP.

3. The method as in claim 1, further comprising:
in response to receiving, at the particular MEP, a continuity check message (CCM) from a fifth remote MEP that is in the configured list, cataloging the CCM of the fifth MEP in a continuity check database (CCDB).

4. The method as in claim 1, further comprising:
confirming the configured list of the particular MEP.

5. The method as in claim 4, further comprising:
utilizing a management application to access and confirm the configured list of the particular MEP.

6. The method as in claim 1, further comprising:
confirming that the first remote MEP of the JAM is in the particular network prior to adding the first remote MEP to the configured list.

7. The method as in claim 6, wherein confirming comprises:
checking a service identifier (ID) within the JAM; and
comparing the service ID within the JAM to a service ID of the particular network.

8. The method as in claim 1, wherein the JAM and LAM are continuity check messages (CCMs) configured to carry a CCM interval field populated with a "0", the method further comprising:
in response to receiving a CCM with a "0" in the CCM interval field, disabling alarms at the particular MEP and looking to a specified maintenance association (MA) discovery field within the CCM to discover whether the CCM is a JAM or LAM.

9. The method as in claim 1, further comprising:
in response to receiving, at the particular MEP, a continuity check message (CCM) from a third remote MEP not in the configured list, generating an unexpected MEP alarm for the third remote MEP.

10. The method as in claim 1, further comprising:
subsequent to adding the first remote MEP to the configured list, in response to not receiving, at the particular MEP, a continuity check message (CCM) from a first remote MEP, generating a missing MEP alarm for the first remote MEP.

11. The method of claim 1, further comprising:
configuring the configured list of MEPs based upon input manually provided by a user.

12. The method of claim 1, further comprising:
entering, at the particular MEP, a joining phase;
transmitting one or more JAMs from the particular MEP to other MEPs within the particular network during the joining phase to request addition of the particular MEP to a configured list of MEPs maintained at the other MEPs without generating an alarm.

13. The method of claim 1, further comprising:
entering, at the particular MEP, an operational phase;
transmitting one or more continuity check messages (CCMs) to the other MEPs within the particular network during the operational phase.

14. The method of claim 1, further comprising:
entering, at the particular MEP, a leaving phase;
transmitting one or more LAMs from the particular MEP to other MEPs within the particular network during the leaving phase to request removal of the particular MEP from a configured list of MEPs maintained at the other MEPs without generating an alarm.

15. The method of claim 14, further comprising:
subsequent to the transmitting one or more LAMs, decommissioning the particular MEP.

16. An apparatus, comprising:
one or more network interfaces adapted to communicate with remote maintenance end-points (MEPs) within a particular network;
one or more processors coupled to the network interfaces and adapted to execute one or more processes;
a memory configured to store a configured list of MEPs within the particular network; and
a MEP continuity module configured to operate in an operational phase, wherein the MEP continuity module during the operational phase:
transmits continuity check messages (CCMs) to the remote MEPs in the particular network;
adds, in response to receiving a join announcement message (JAM) from a first remote MEP not in the configured list that requests addition of the first remote MEP to the configured list without an unexpected MEP alarm, the first remote MEP to the configured list without alarm; and
removes, in response to receiving a leave announcement message (LAM) from a second remote MEP in the configured list that requests removal of the second remote MEP from the configured list without a missing MEP alarm, the second remote MEP from the configured list without alarm.

17. The apparatus as in claim 16, wherein the MEP continuity module is further configured to operate in a joining phase, wherein the MEP continuity module during the joining phase initiates its CCM transmission to the remote MEPs in the particular network by transmission of one or more JAMs to request addition of the apparatus to a configured list of MEPs within the particular network at each of the remote MEPs without alarms.

18. The apparatus as in claim 16, wherein the MEP continuity module is further configured to operate in a leaving phase, wherein the MEP continuity module during the leaving phase ceases its CCM transmission by transmission of one or more LAMs to the remote MEPs in the particular network to request removal of the apparatus from the configured list at each of the remote MEPs without alarms.

19. The apparatus as in claim 16, wherein the MEP continuity module is further configured to, during the operational phase:
generate an unexpected MEP alarm in response to receiving a CCM from a remote MEP not in the configured list; and
generate a missing MEP alarm in response to not receiving a CCM from a remote MEP that is in the configured list.

20. Software encoded on one or more non-transitory computer readable media that when executed is operable to:
maintain a configured list of particular maintenance end-point (MEPs) within the particular network;
in response to receipt of a join announcement message (JAM) from a first remote MEP not in the configured list that requests addition of the first remote MEP to the configured list without an unexpected MEP alarm, add the first remote MEP to the configured list without the unexpected MEP alarm;
process one or more received continuity check messages (CCMs) from the first remote MEP that has been added to the configured list; and
in response to receipt of a leave announcement message (LAM) from the first remote MEP that has been added to the configured list that requests removal of the first remote MEP from the configured list without a missing MEP alarm, remove the first remote MEP from the configured list without the missing MEP alarm.

21. The software encoded on one or more non-transitory computer readable media of claim 20, when executed, further operable to:
in response to subsequent non-receipt of one or more CCMs from the first remote MEP that has been added to the configured list, generate the missing MEP alarm for the first remote MEP.

22. The software encoded on one or more non-transitory computer readable media of claim 20, when executed, further operable to:
in response to receipt of a CCM from a second remote MEP not in the configured list, generate the unexpected MEP alarm for the second remote MEP.

23. The software encoded on one or more non-transitory computer readable media of claim 20, when executed, further operable to:
in response to receipt of the one or more CCMs from the first remote MEP, catalog the CCMs of the first MEP in a continuity check database (CCDB).

24. The software encoded on one or more non-transitory computer readable media of claim 20, when executed, further operable to:
configure the configured list of MEPs based upon input manually provided by a user.

* * * * *